United States Patent [19]

Fadem

[11] Patent Number: 5,155,826
[45] Date of Patent: Oct. 13, 1992

[54] MEMORY PAGING METHOD AND APPARATUS

[76] Inventor: Richard J. Fadem, 69 Appletree La., Roslyn Heights, N.Y. 11577

[21] Appl. No.: 280,048

[22] Filed: Dec. 5, 1988

[51] Int. Cl.⁵ .................................. G06F 12/06
[52] U.S. Cl. ........................ 395/425; 364/254; 364/254.3
[58] Field of Search ... 364/200 MS File, 900 MS File

[56] References Cited

U.S. PATENT DOCUMENTS

| | | | |
|---|---|---|---|
| 3,344,403 | 6/1964 | Foulger et al. | 340/172.5 |
| 4,027,291 | 5/1977 | Tokura et al. | 340/172.5 |
| 4,028,683 | 6/1977 | Divine et al. | 340/172.5 |
| 4,068,303 | 1/1978 | Morita | 364/200 |
| 4,156,905 | 5/1979 | Fassbender | 364/200 |
| 4,158,227 | 6/1979 | Baxter et al. | 364/200 |
| 4,176,400 | 11/1979 | Heckel | 364/900 |
| 4,179,738 | 12/1979 | Fairchild et al. | 364/200 |
| 4,306,287 | 12/1981 | Huang | 364/200 |
| 4,368,515 | 1/1983 | Nielsen | 364/200 |
| 4,374,417 | 2/1983 | Bradley et al. | 364/200 |
| 4,386,773 | 6/1983 | Bronstein | 273/1 E |
| 4,410,941 | 10/1983 | Barrow et al. | 364/200 |
| 4,432,067 | 2/1984 | Nielsen | 364/900 |
| 4,443,847 | 4/1984 | Bradley et al. | 364/200 |
| 4,473,877 | 9/1984 | Tulk | 364/200 |
| 4,481,570 | 11/1984 | Wiker | 364/200 |
| 4,485,457 | 11/1984 | Balaska et al. | 364/900 |
| 4,500,961 | 2/1985 | Engles | 364/200 |
| 4,503,491 | 3/1985 | Lushtak et al. | 364/200 |
| 4,613,953 | 9/1986 | Bush et al. | 364/900 |
| 4,831,522 | 5/1989 | Henderson et al. | 364/200 |

*Primary Examiner*—Michael R. Fleming
*Assistant Examiner*—Debra A. Chun

[57] ABSTRACT

A method and apparatus to operate a paged memory system which uses only a single, predetermined address per page as a memory-mapped address. When the single memory-mapped address is accessed repeatedly by an unusual sequence, a sequence detector changes the currently addressed page of memory to a new page. The unusual sequence is a normally absurd sequence of READs to a single unchanged address location. Because the unusual sequence only uses the predetermined address and not the data stored therein, the address location is usable as a normal RAM location for all other operations. Such a method and apparatus permits an expansion of the memory space in an electronic data system where there are a fixed number lines in the address bus and where the electronic data system is already using the maximum number of addresses which can be accessed by the address bus in one cycle.

14 Claims, 8 Drawing Sheets

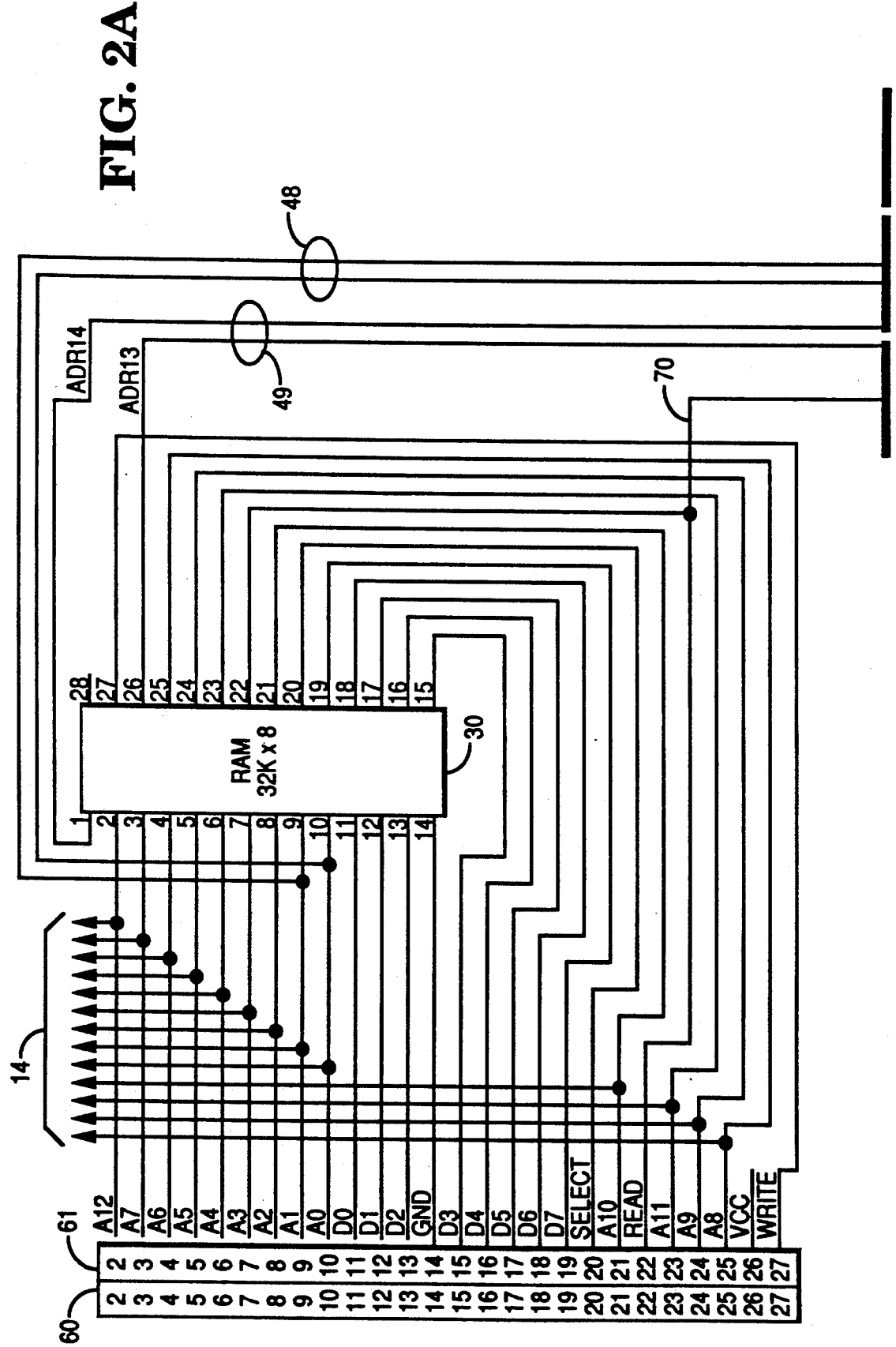

MEMORY PAGING METHOD AND APPARATUS

BACKGROUND OF THE INVENTION

The present invention relates to an apparatus for expanding the memory of an electronic data system, and more particularly for expanding a single or non-paged electronic data system into one with multiple pages.

A recurrent problem of existing electronic data systems is the lack of sufficient memory for expansion of capabilities. Existing electronic data systems usually do not have the capacity to store and operate with such additions as new application programs and extended executive/utility programs. A substantial part of this problem comes from the inability of the existing hardware to accommodate the additional address connections of further memory circuits. Existing systems just do not have extra address lines available to address an expanded memory such as 256 kilobit VLSI RAM circuits.

Each electronic data system is manufactured with a fixed number, N, of conductors in the address bus. This limits the number of of binary memory addresses that can be directly addressed in one cycle to a maximum of two raised to the Nth power, as is well known. Since it is usually economically impractical to increase the size of the address bus on an existing printed circuit board, a number of techniques have been used to access an expanded memory over the existing address bus. These usually consist of a variation of a bank switching or a paging technique.

In this type of paging, each page of memory has the maximum number of addresses directly addressable in one cycle by the existing address bus conductors. Additionally, each page has a page address as well. Thus, to access a memory location the page must first be selected and then all the address locations on that page can be addressed directly. However, these known techniques typically use memory mapped paging with a number of address locations of each page as the page selection addresses. These page selection addresses are decoded by each page to determine which is currently selected. A store to one of the selection addresses activates its corresponding page, and that page remains active until another page is selected. Such systems are shown in U.S. Pat. Nos. 4,432,067 and 4,368,515 issued to Nielsen on Feb. 14, 1984 and Jan. 11, 1983 respectively. Also of this type are the second embodiment of U.S. Pat. No. 4,473,877 issued to Tulk Sep. 25, 1984, and U.S. Pat. No. 4,485,457 issued to Balaska et al. Nov. 27, 1984.

This method uses as many addresses of each page as there are pages in order to provide for this type of memory mapped selection. This puts a number of "dead spots" in each page which the software must accommodate. These "dead spots" in each page require extra programming directions to be included in either the operating system or in the executing program in order for the desired program to run on such a newly paged system.

Many other known methods and apparatus of expansion to bank switched or paged systems use an additional control output line from the central processor to assist in the bank switching or paging. Such systems are described in U.S. Pat. Nos. 4,386,773 issued to Bronstein Jun. 7, 1983, the first embodiment of 4,473,877 issued to Tulk supra, and 4,158,227 issued to Baxter et al. Jun. 12, 1979. The device of Bronstein uses an unspecified control bus line to control the enabling of the the initial decoder and thereafter uses various logic components and delay elements. The device of Baxter et al. uses the Input/Output Write line and the Direct Memory Access lines for page selection. The first embodiment of Tulk also uses an Input/Output line as part of the bank switching/paging control mechanism. The use of other control lines to expand the address space requires unusual code sequences for paging, as well as one or more extra wires added essentially as a further line of the address bus.

It is an object of this invention to provide an existing system with an expanded paged memory without any "dead spot" addresses in the pages.

It is another object of this invention to provide an existing system with an expanded paged memory which uses the same connections as the original smaller memory that it replaces.

SUMMARY OF THE INVENTION

Briefly stated, an apparatus for expanding the memory of an existing electronic data system into a paged memory electronic data system is provided which does not require the connection of additional lines. Instead of adding extra lines to control the expanded memory, the apparatus responds to an unusual address sequence which is transmitted by the processor via the existing address bus. The last portion of the unusual address sequence contains information which is decoded by the apparatus to select the next memory page to be accessed.

In accordance with one aspect of the invention, the foregoing objects are achieved by providing a memory paging apparatus including a processor which is connected to an address bus, a data bus, a READ control line, and a device select line. A memory device which has a number of addresses that are divided into a number of N pages is connected to the processor at a second end of the address bus, a second end of the data bus, and a second end of the READ control line. A device for detecting a sequence of a predetermined number of contiguous READs to a predetermined address in one of the N pages and for changing the logic state of its output is also connected to the processor by the address bus and the READ control line. A latch is connected to and responsive to the output of the sequence detecting device, as well as, connected to a portion of the address bus. When the sequence of predetermined READs is detected, the latch latches a portion of the next address on the address bus which is a page switching instruction. A second device is connected to and is responsive to the output of the latch, and is also connected to the processor by the device select line. This second device selects one of the N pages of the memory device in order to access a memory location of the selected page.

In another aspect of the invention, the objects of the invention are also achieved by providing a method for accessing a page of a paged memory having the steps of: performing a READ operation from a predetermined address location, repeating the previous READ operation at least once; detecting the sequence of READ operations to the preselected address location and controlling a latch according to the detected sequence; performing a READ operation from an address in which a page selecting word is encoded; latching the page selecting word in a latch device according to the detected sequence; and decoding the page selecting word and selecting the page of the paged memory to which a subsequent access is performed.

BRIEF DESCRIPTION OF THE DRAWINGS

While the specification concludes with the appended claims particularly pointing out and distinctly claiming the subject matter which is regarded as the invention, it is believed that the invention will be better understood from the following description of the illustrative embodiments taken in conjunction with the accompanying drawings in which:

FIGS. 2A and 2B when joined along the dashed lines form a functional block diagram of an paged memory device and the control circuitry therefor;

DETAILED DESCRIPTION OF A PREFERRED EMBODIMENT

Figure 1:
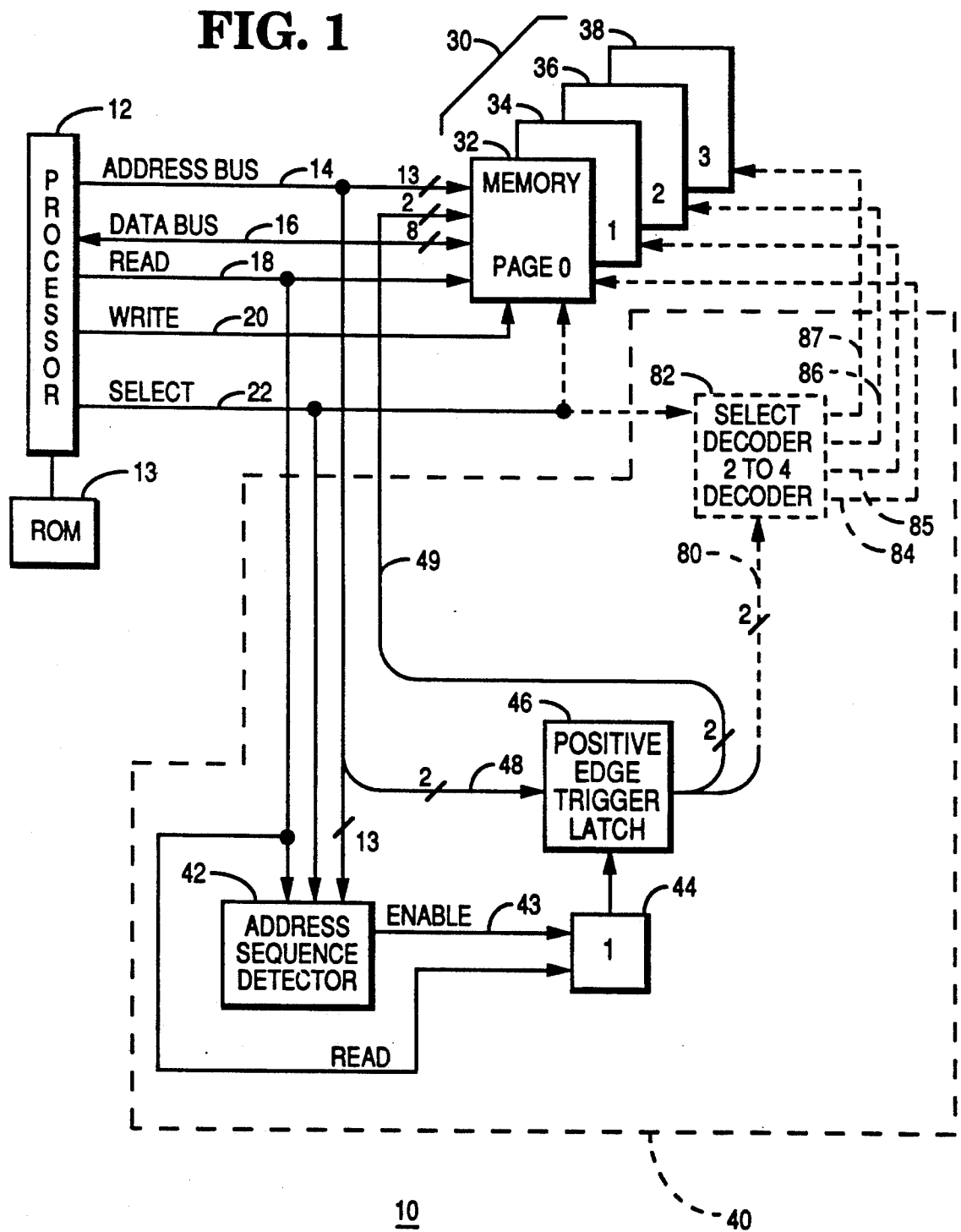
FIG. 1 is a block diagram of one embodiment of an electronic data system according to the invention.

Referring now to FIG. 1, there is seen an electronic data system 10 in accordance with the present invention. The system 10 is controlled by a sequencing and controlling device such as a processor 12. The processor 12 is connected to one end of an address bus 14 over which memory locations are addressed. In the preferred embodiment of FIG. 1 the address bus 14 has thirteen lines, which would limit the directly addressable memory to $2^{13}$ locations without paging, but it shall be understood that the invention applies to systems with different numbers of lines in their address buses. It goes without saying that if the number of lines in the address bus changes, then the limit of directly accessible memory would change accordingly. If the processor 12 is the only sequencing and controlling unit in the system 10, then it will be the only unit that transmits address data across the address bus 14, otherwise the processor 12 will share that function with any other unit having an addressing capability.

The processor 12 also connects to one end of a bidirectional data bus 16, which communicates data between the processor 12 and any other unit connected to the data bus 16. As with the address bus 14, the preferred embodiment shown in FIG. 1 has an eight line data bus, but the invention is not limited to the size of the data bus 16.

The processor 12 further is additionally connected to: a READ control line 18, a WRITE control line 20, and a SELECT control line 22. These lines 18-22 are driven low when asserted by the processor 12. The function of the lines 18-22 is to coordinate the addressing of data and the transferring of data between the processor 12 and memory as will be explained below.

A memory 30 is connected directly to the address bus 14, the data bus 16, the READ line 18, and the WRITE line 20. The memory 30 is also either directly or indirectly connected to the SELECT line 22. The memory 30, which can be a combination of read only memory and random access memory, is segmented into multiple pages 32, 34, 36, 38. The preferred embodiment has four pages although the invention is not so limited, as systems with greater than four pages are also contemplated by the invention. Each page 32-38 has $2^M$ memory locations where M is the number of address lines in the address bus 14. In the preferred embodiment shown in FIG. 1, M equals thirteen and therefore each page has eight thousand one hundred ninety-two locations. The pages 32-38 may be segmented onto different integrated circuit chips, or may be different segments of the same integrated circuit chip. The Select line 22 is shown by the dashed lines for an embodiment where the pages 32-38 have separate select or enable connections, and is shown by a solid line for an embodiment where the pages 32-38 are upon a single integrated circuit chip with a single select or enable connection.

A page selecting circuit 40 is connected to the address bus 14, and the READ line 18. The page selecting circuit 40 includes an address sequence detector 42 which detects an unusual sequence to a single address, designated as the page control address, on each page 32-38. An output line 43 is connected to an output of the address sequence detector 42. Both the output level of line 43 and the output level of the READ line 18, are active lows when asserted. The output of line 43 is logically combined with the output of the READ line 18 by OR gate 44. The output level of the OR gate 44 will be a low if both the output level of the READ line 18 and the output level of the line 43 are low. Similarly, when the output level of either the READ line 18 or the line 43 is high, the output of the OR gate 44 is high.

Since the READ line 18 is connected to the clock input of the address sequence detector 42 and controls the other inputs thereto, the three significant outputs from the OR gate 44 all depend in part on the level of the READ line 18. If the unusual sequence has not been detected, then the output level of OR gate 44 is high, regardless of the level of READ line 18. When the unusual sequence is detected, the the output level of the line 43 changes from the previous high level to a low level; however, because of internal propagation delays, the output of the READ line 18 will have returned to a high level before the output level of line 43 goes low. Since the low to high transition of the output of the READ line 18 clocks the last part of the unusual sequence into the address sequence detector 43, the output of the OR gate 44 will be high until the next READ cycle of the processor 12. During the next read cycle after the unusual sequence, the output of the OR gate 44 follows the output of the READ line 18 and transitions from its high level to a low level at the start of the READ cycle, and then transitions from a low level to a high level with the output of the READ line 18. This low to high transition instructs a positive edge triggered latch 46 to store the binary values input thereto on bus 48, the reason for which will be presented below.

The bus 48 is a subdivision of the address bus 14. In the preferred embodiment, the bus 48 takes the two least significant bits of the address bus 14 as inputs to the latch 46. If only two pages or more pages than the four pages of expanded memory are required, then the number of bits from the address bus 14 and the size of the latch 46 can be decreased or increased accordingly. Also, the least significant bits of the bus are only used because of the ease of access thereto, but other embodiments of the invention could use any predetermined combination of bits from the address bus 14. Whatever binary value is on the bus 48 at the end of the first READ cycle after the unusual sequence is latched into the latch 46. This address can be any address as long as the value on the bus 48 selects the desired page for the next memory operation. The only exception is that the paging address cannot be the same as the signal address used by the unusual sequence, since that would put the paging system in a constant page selection mode. The output of the latch 46, in the embodiment shown in FIG. 1, is connected to an input of a memory unit 30 by line 49. The line 49 is the preferred embodiment and thus is shown as a solid line, other embodiments will be discussed later.

Figure 2B:
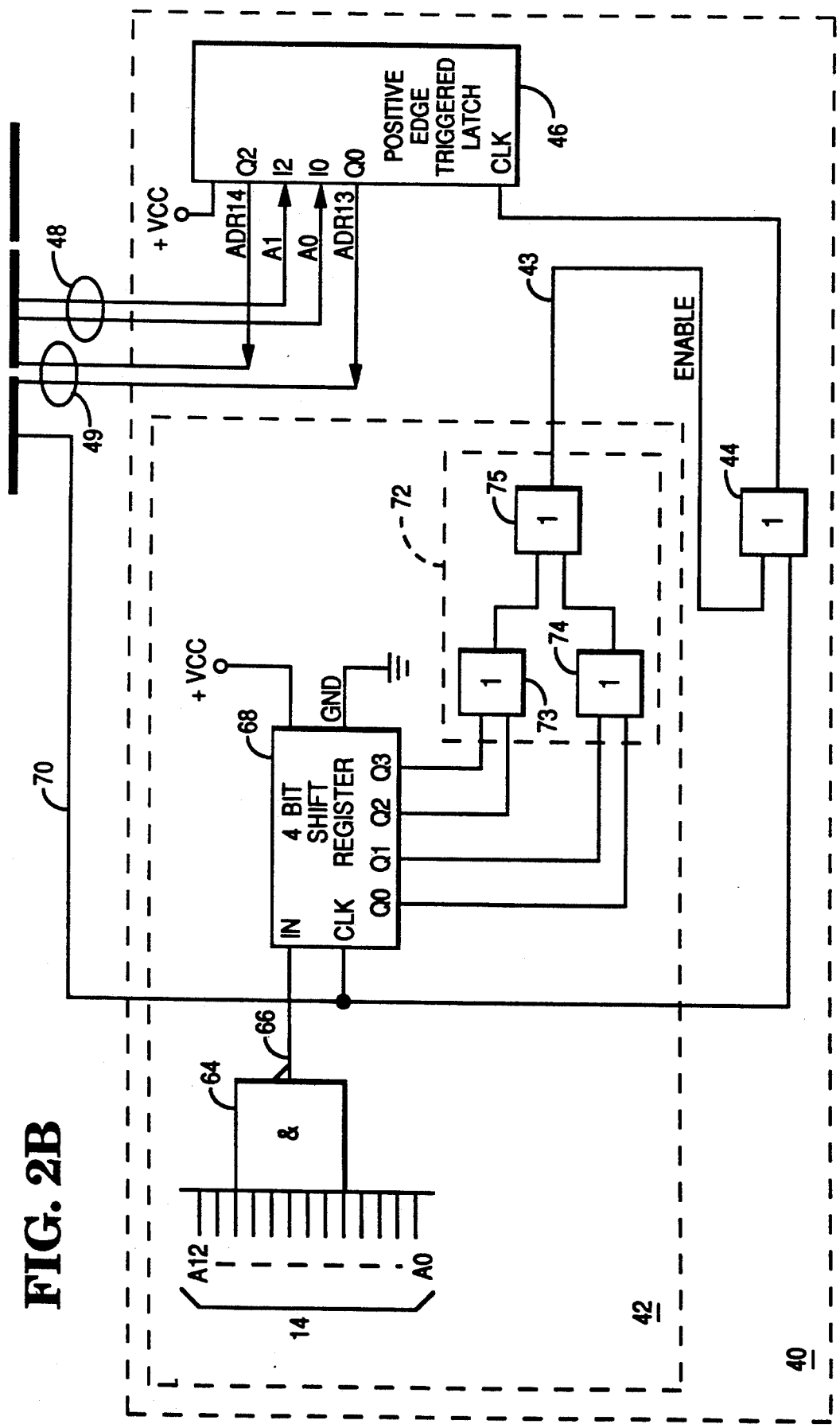

Referring now to FIGS. 2A and 2B, a circuit for the preferred embodiment of the electronic data system 10 will be described. A connector 60 is the connector which formerly connected a single page memory of eight thousand ninety-six eight bit words to the processor 14 (not shown in FIGS. 2A and 2B). The connector 60 has connections to A0–A12 which are the thirteen lines of the system address bus 14. The connector 60 also has connections to D0–D7, which are the eight lines of the system data bus 16, as well as, connections to the READ line 18, the WRITE line 20, the SELECT line 22, and the voltage supply lines. The preferred embodiment shown in FIG. 2A removes the former 8K words by 8 bit random access memory (not shown) and replaces it with a 32k words by 8 bit paged memory 30, such as a Toshiba model no. 55257. The paged memory 30 is connected to the connector 60, and hence to the processor 12, by a connector 61 which mates with the connector 60. From the connector 61 to the paged memory 30, the address bus 14 is connected to the address inputs A0–A12, the data bus 16 is connected to the data inputs D0–D7, the READ line 18 is connected to the READ input, the WRITE line 20 is connected to the WRITE input, and the SELECT line 22 is connected to the SELECT input. Thus, each page of the paged memory 30 has all the control connections of a 8K word by 8 bit random access memory, and can be operated as such by the processor 12 (not shown in FIG. 2A). The only difference being that each page has one pre-selected signal address which, in addition to storing data in the usual manner, is used as a part of a unusual sequence for changing the currently addressed page. The page changing is accomplished by the operation of the page selecting circuit 40 in response to the unusual sequence as described below.

Referring now to FIG. 2B, the connections between the connector 61 to the page selecting circuit 40 will be described. The address bus 14 has all thirteen of its lines connected to a NAND gate 64, such as Texas Instrument model no. 74LS133, which operates as a decoder for the address location 1FFF (hexadecimal) which corresponds to 8191 (decimal). The output of the NAND gate 64 is a high logic level except when each of its inputs are set to a high logic level, i.e., address location 1FFF (hexadecimal). The output of the NAND gate 64 is connected to an input of a shift register 68 by conductor 66. The shift register 68 is a four bit shift register that clocks the input level into the first register on a low to high transition on its CLK input. Such a shift register is available from Texas Instrument as model no. 74LS164. The model no. 74LS164 is an eight bit serial in/parallel out shift register, so not all of the bits are used. The CLK input of the shift register 68 is connected via conductor 70 to the READ line 18. Thus, with every READ operation to address location 1FFF (hexadecimal) a low logic level will be clocked into the first register of shift register 68. After four subsequent READ operations are made to location 1FFF (hexadecimal), four low levels will have been shifted into the four stages of the shift register 68. The four outputs Q0–Q3 are connected to a decoder circuit 72. The output of the decoder circuit is connected to the output line 43 of the address sequence detector 42. The decoder circuit 72 consists of OR gates 73, 74, 75 which are connected to function as a four input OR gate. Therefore, if any of the outputs Q0–Q3 is a high logic level, the output to line 43 will be a high logic level. Moreover, if all of the outputs Q0–Q3 are at low logic level, then the output to line 43 will be a low logic level.

The conductor 70, which is an extension of the READ line 18, is connected to one input of the OR gate 44, and the output line 43 is connected to the other input of the OR gate 44. The connections and operation of the OR gate 44 and the latch 46 have already been described in regard to FIG. 1, and so that description will not be repeated here.

In the preferred embodiment, the memory unit 30 has all of the pages of the paged memory as segments thereof. In such an arrangement, the pages are determined by the most significant address bit positions. The preferred embodiment has four pages, and therefore, two most significant address bit positions are required. If desired, five to eight pages would require three most significant bit positions, nine to sixteen pages would require four, and so on. In the preferred embodiment, the number of inputs on bus 48 to the latch 46 is at least sufficient to latch in the page number in the single READ cycle that occurs after the unusual sequence. In alternative embodiments, the output of the latch 46 is connected by a bus 80 to a decoder 82 (see FIG. 1). The input to the decoder 82 is the SELECT line 22. The outputs of the decoder 82 are connected by lines 84–87 to respective SELECT terminals on separate memory units 32, 34, 36, and 38. In these alternative embodiments, shown by the dashed lines in FIG. 1, the SELECT signal from the processor 12 is switched by the decoder 82 to select the individual page and memory unit 32–38 which is indicated by the binary value stored in the latch 46.

Figure 5:
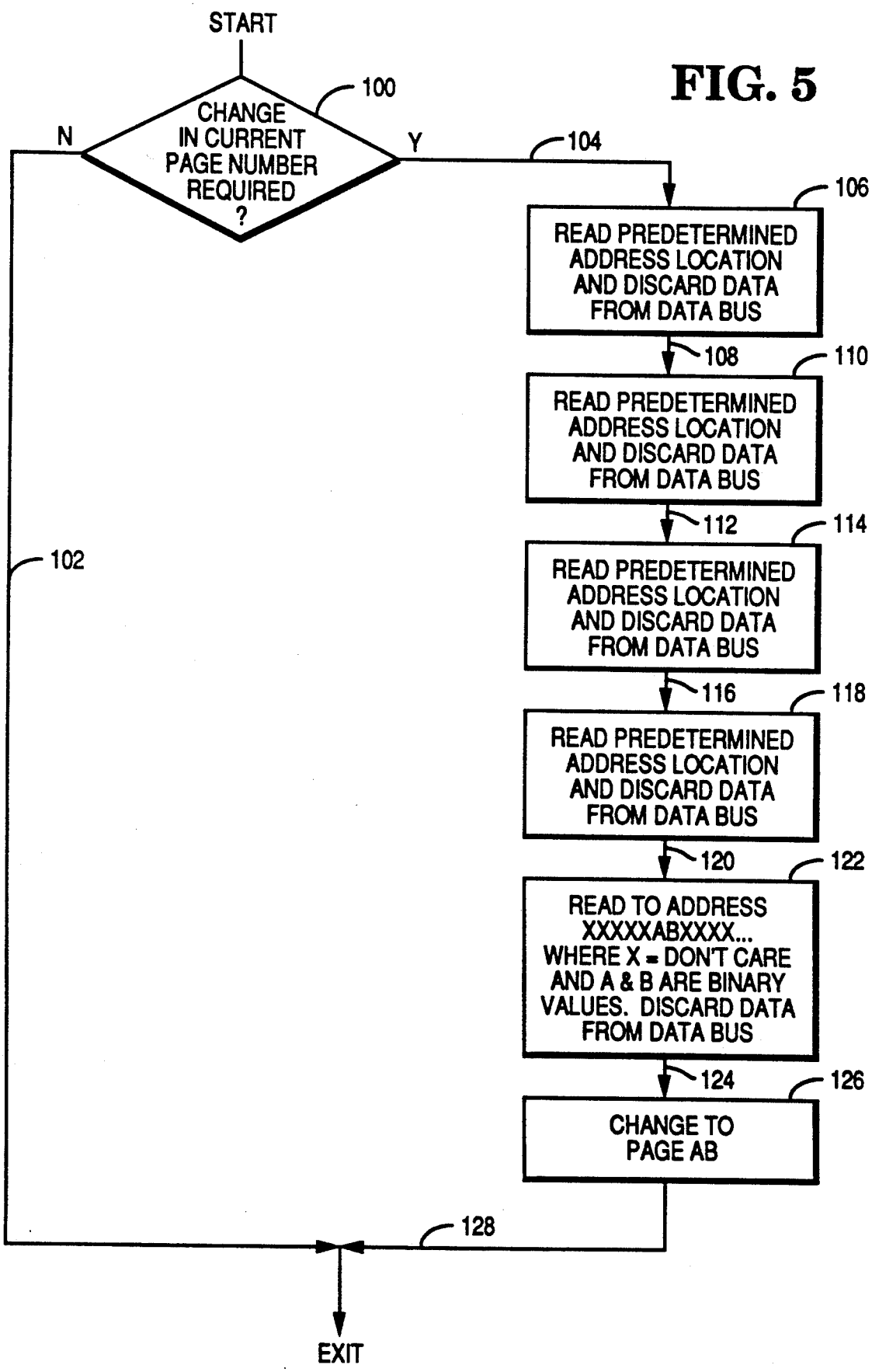
FIG. 5 is a flow diagram of the method of accessing a page of a paged memory.

Referring now to FIGS. 1 and 5, the method of changing pages and the unusual sequence involved are described. Initially, a decision is made at an operation 100 whether to change the current page or not. This decision is either made by the programmer if access to a specific page is always required, or this decision could be part of an executing program which changes the page depending upon the state of some variable. If the decision to change the current page is no, then the program follows a path 102 and exits the method. If, however, the decision at 100 is to change the current page, then the method follows a path 104 to an operation at 106. At 106, the processor 12 sends the signal address 1FFF across the bus 14 and strobes the READ line 18. The current page of the paged memory 30 reads and retrieves the data which is stored in address location 1FFF. This data is forwarded across the data bus 16, leaving the value stored in address location 1FFF unchanged. Since this retrieved data is not used during the paging operation, it is discarded by the processor 12. Next, the method follows path 108 to the operation at 110 where the processor 12 performs an operation which is the same as the operation at 106. After the operation at 110, the method follows path 112 to the operation at 114, which again is the same operation as the operation at 106. After the operation at 114, the method follows the path 116 to the operation at 118, which again is the same operation as the operation at 106. The four consecutive READ operations 106, 110, 114, and 118 to the predetermined signal address comprise the unusual sequence. This sequence is unusual because it does not make sense to perform multiple consecutive READ operations to the same memory address. Whatever function that is required can be performed by one or at most two consecutive READs to the same memory address, but after two READs for possible checking/diagnostic purposes there is no reason to make any more consecutive READs to the same address. The present invention uses four consecutive READs, although other variations of the unusual multiple READ sequence will occur to those skilled in the art. At the end of the unusual sequence the address sequence detector 42 has set up the OR gate 44 and the latch 46 to store a portion of the next READ address as the next current page.

After the operation at 118, the method follows the path 120 to the operation at 122. At 122, the processor 12 performs a READ operation to address ... XXXXXAB..., where X is defined as a "don't care" value, and A and B are the page selecting binary bits. Those in the art will appreciate that A and B can appear anywhere in the address because the data at the location READ is unmodified and the data returned from the READ location is discarded. In the preferred embodiment, A and B are the least significant bits of the address bus (see FIG. 2B). Since the page selecting circuit 40 has been prepared by the unusual sequence, the binary bits A and B are latched into the latch 44. As described previously, the value AB stored in the latch 44 subsequently determines the current page to which all memory operations are directed. As mentioned before, as long as the address ... XXXXXAB ... does not equal the signal address, then this last page changing READ will not appear to the address sequence decoder 42 as part of the unusual sequence and the page changing method will be completed after the next operation. At the completion of the operation at 122, the method follows path 124 to the operation at 126 which is to change the current page to page AB (binary) for all accesses before the next page change. After the operation at 126, the method exits along path 128.

Figure 3:
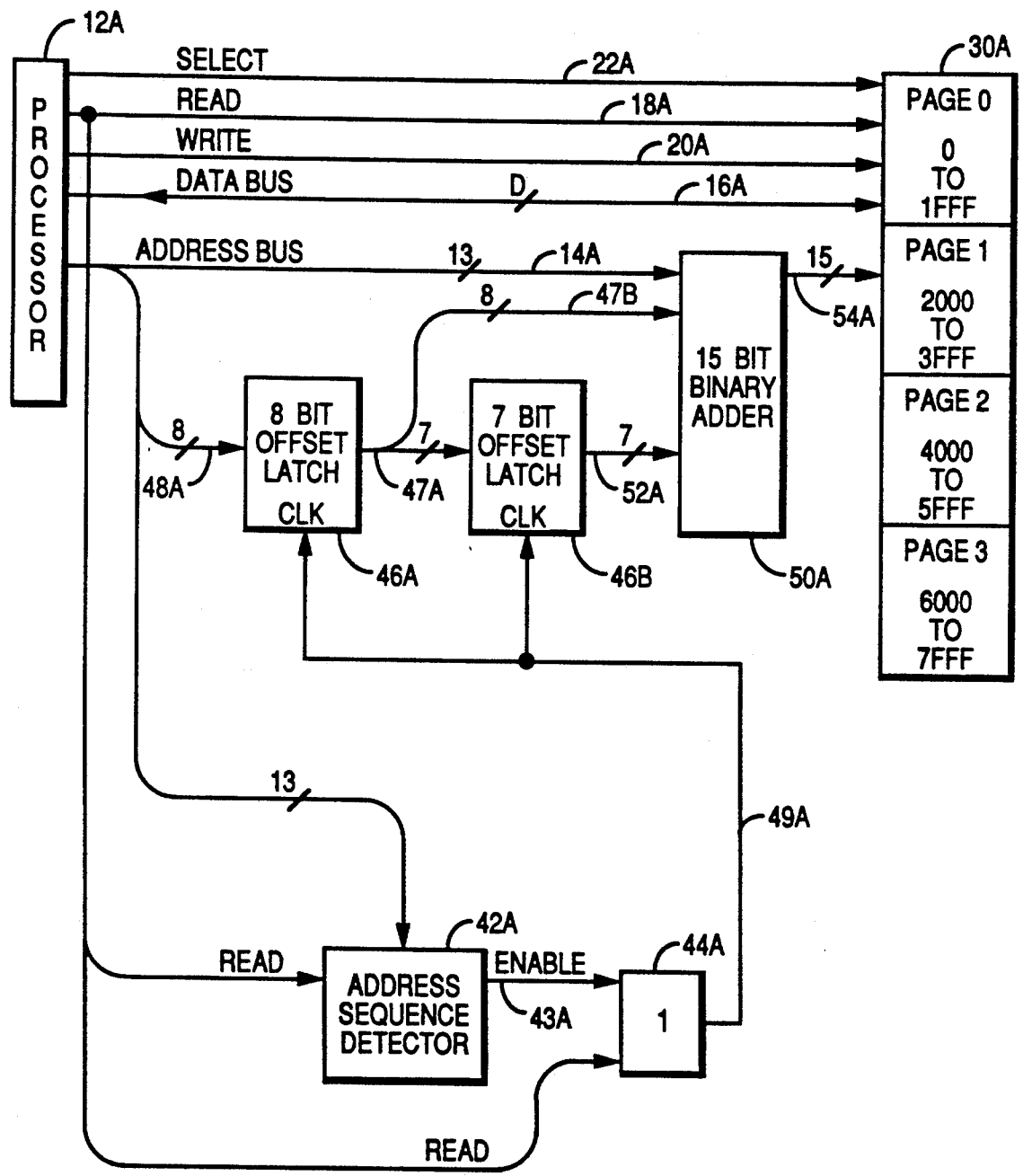
FIG. 3 is a functional block diagram of a second embodiment of the invention with automatic page crossing control.
Figure 4:
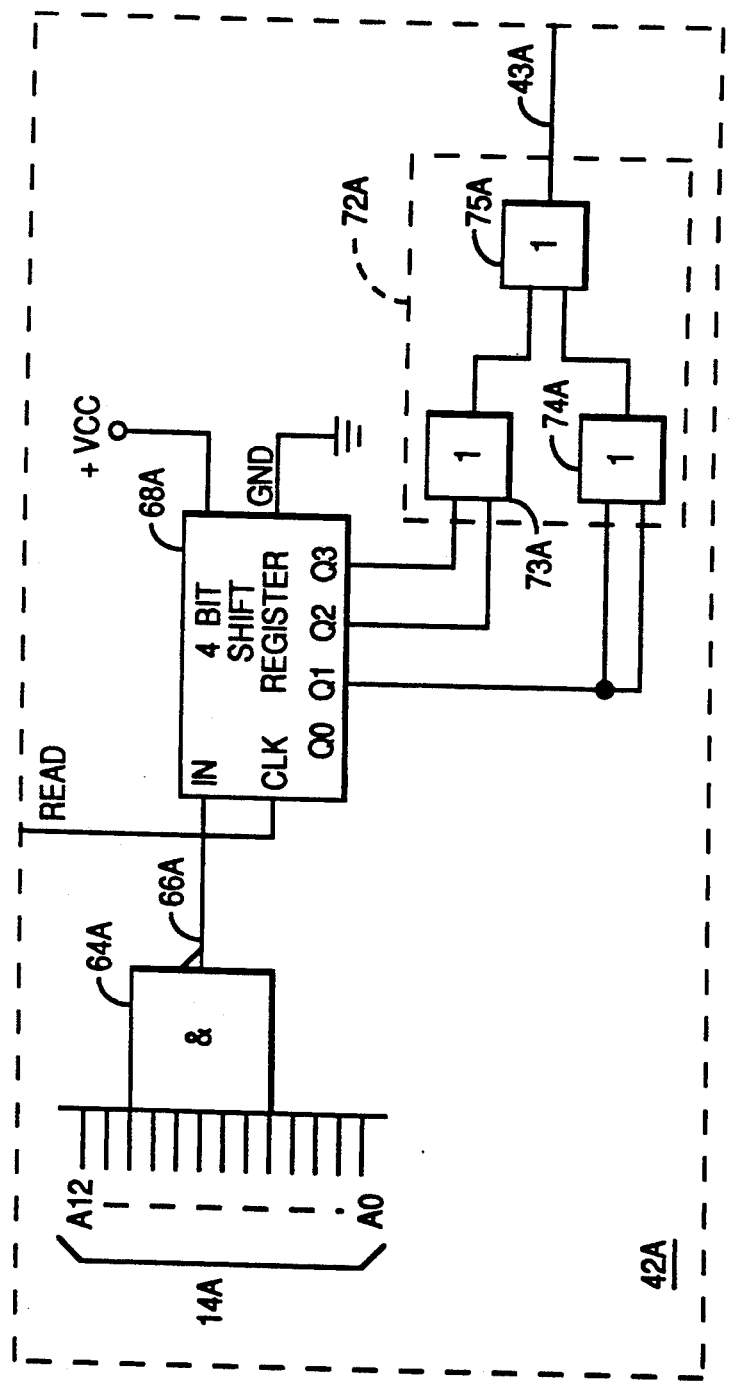
FIG. 4 is a detailed block diagram of an address sequence detector, for the automatic page crossing embodiment shown in FIG. 3.

A particularly useful second embodiment of the invention is a self paging electronic data system 10A seen in FIGS. 3 and 4, in which the similar designations denote similar elements to the embodiment shown in FIG. 1. Referring to FIG. 3, the processor 12A is connected to the paged memory 30A by the data bus 14A, the READ line 18A, the WRITE line 20A, and the SELECT line 22A as in the aforementioned preferred embodiment shown in FIG. 1. The processor 12A is also connected to the address sequence detector 42A and the OR gate 44A by the address bus 14A and the READ line 18A as the embodiment shown in FIG. 1. Referring to FIG. 4, the address sequence detector 42A is very similar to the address sequence detector shown in FIG. 1. The only difference is that the least significant output Q0 of the shift register 68A is not connected to an input to OR gate 74A. Instead, this input is connected to the second least significant output Q1 of the shift register 68A. This change allows two READ operations to be made after the address sequence detector 42A has detected the unusual sequence instead of the single READ operation allowed by the embodiment shown in FIG. 1. Referring back to FIG. 3, the output of the address sequence detector 42A is connected by output line 43A to OR gate 44A in the same way as the embodiment shown in FIG. 1. The output from OR gate 44A on conductor 49A is essentially the same as the embodiment shown in FIG. 1. The main differences appear in the page selecting circuitry and the processor-memory interconnection, which will be explained below.

Instead of the positive edge triggered latch 46 shown in FIG. 1, the system 10A shown in FIG. 3 has a positive edge triggered eight bit latch 46A connected to the processor 12A by an eight bit bus 48A. Bus 48A is a subdivision of the address bus 14A. The seven bits of the eight bit output of the latch 46A are connected to the inputs of a successive seven bit latch 46B by a bus 47A. Further, the eight bit output of the latch 46A is connected to eight inputs of a fifteen bit binary adder 50A. The seven bit output of the latch 46B is connected to the remaining seven inputs of the fifteen bit binary adder 50A by bus 52A. The eight bits from the latch 46A are concatenated with the seven bits from the latch 46B to form one fifteen bit offset input to the adder 50A. The thirteen bit address bus 14A is connected to the adder 50A. The address bus 14A thus provides a second input to the thirteen least significant bits of the adder 50A. The adder 50A adds the fifteen bit offset to the current address on the address bus 14A to automatically cross pages within the 32K word by 8 bit memory 30A.

Figure 6A:
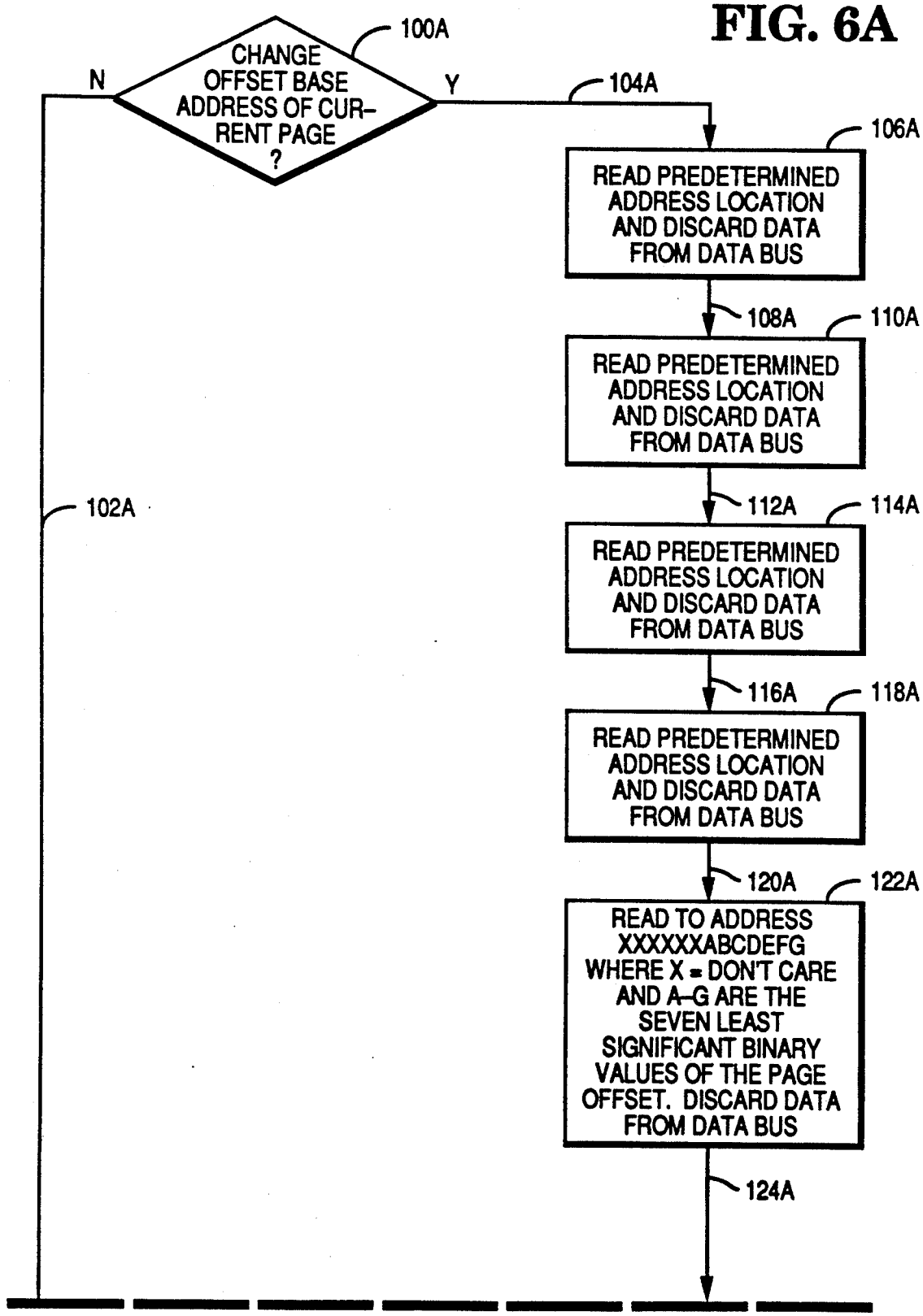
FIGS. 6A and 6B when joined along the dashed lines form a flow diagram of a method for automatically crossing a physical page of memory using an offset address.
Figure 6B:
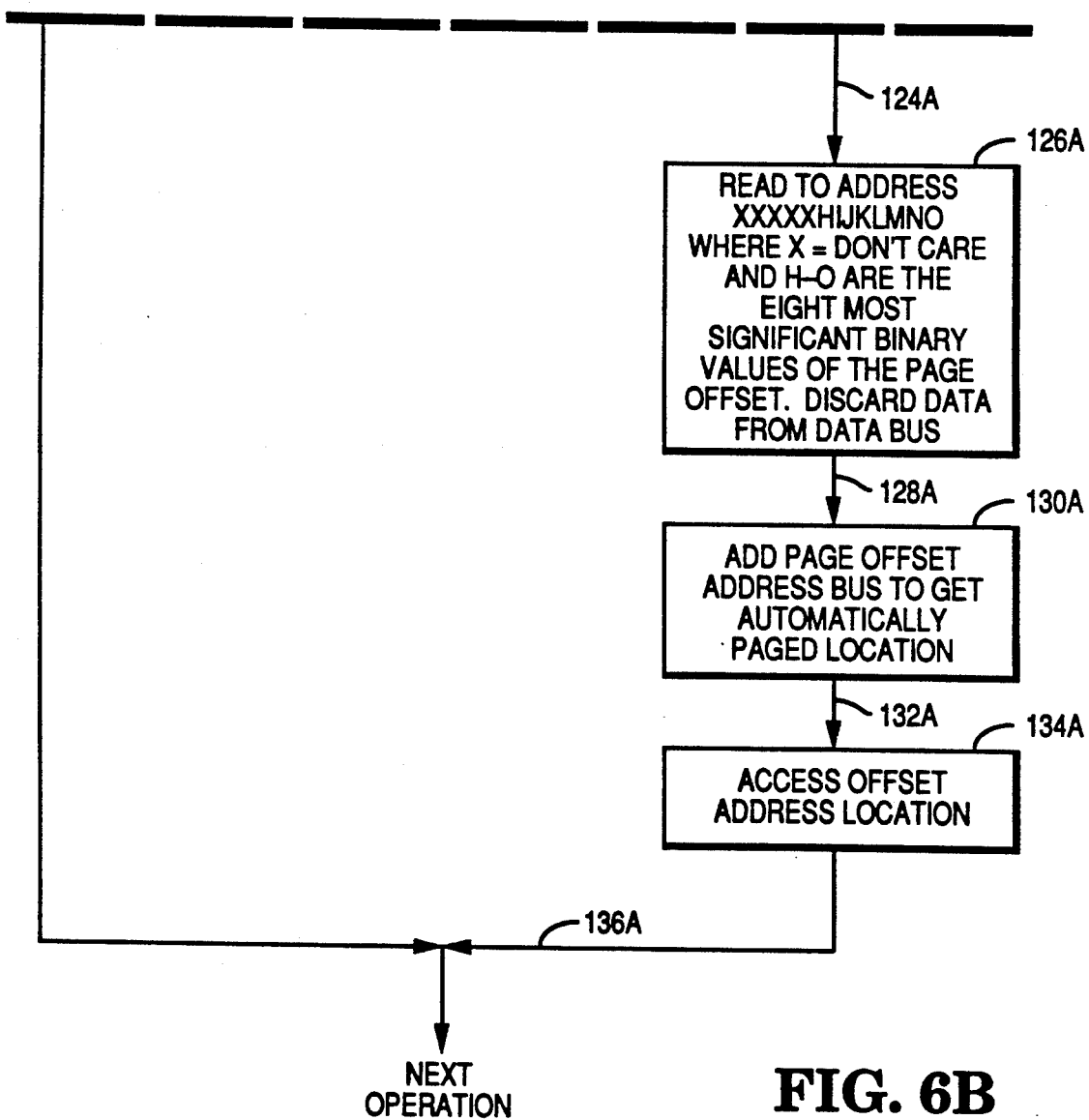

The method used to operate this second, self paging embodiment, which automatically crosses page boundaries, is seen in FIGS. 6A and 6B. At the beginning of the method, a decision is made at operation 100A if a new offset is desired. If not, the method follows path 102A and exits this process. If a new offset is desired then paths 104A, 108A, 112A 116A, and 120A are followed, and operations 106A, 110A, 114A, and 118A of a unusual sequence are performed in essentially the same way and with essentially the same result as the corresponding paths and operations described in FIG. 5. At operation 122A, however, seven bits of a fifteen bit offset value are clocked into the eight bit latch 46A (see FIG. 3). Because of the change in the address sequence detector 42A (see FIG. 3) described above, the path 124A is followed to the operation at 126A where the remaining eight bits of the fifteen bit offset value are clocked into latch 46A, while concomitantly clocking the previous contents of latch 46A into seven bit latch 46B (see FIG. 3). After assembling the offset value in latches 46A and 46B, the method follows path 128A to the operation at 130A. At 130A, the offset value is added to the the next thirteen bit READ or WRITE address in order to access an offset index address which may cross a page of the paged memory automatically. Next the method follows the path 132A to the operation at 134A where the offset memory location is actually accessed. At this point, the method follows the path 136A and exits the automatic page crossing method until a change to the current offset is desired. This method is more flexible because it permits a flexible definition of page boundaries, but it is more complex than the method of the preferred embodiment.

Thus, it will now be understood that there has been disclosed a method and apparatus for operating a paged memory which provides an expanded paged memory without requiring any "dead spots" through the utilization of a simple, but unusual instruction sequence. While the invention has been particularly illustrated and described with reference to particular embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. In a data processing system having a processor, an address bus and a data bus, a memory system comprising:
 a memory device having a plurality of address locations divided into a plurality of pages connected to said address bus;
 means for latching a paging control bit on said address bus representing one of said pages in response to an unusual sequence of at least three READ operations to a preselected address without an intervening WRITE operation to any address; and
 select means connected to said latching means and to said memory device, said select means being responsive to said latching means for selecting one of said pages of said memory device for an access to a memory location of said selected page.

2. An apparatus, comprising:
 a processor having an address port, a data port, and a control port;
 an address bus connected to one terminus to said address port of said processor;
 a data bus connected at one terminus to said data port of said processor;
 a READ line connected at one terminus to a READ control line connection of said control port of said processor;
 a select line connected at one terminus to a select control line connection of said control port of said processor;
 a memory device having a plurality of addresses divided into a plurality of N pages connected to a second terminus of said address bus, a second terminus of said data bus, and a second terminus of said READ line;
 means for detecting a sequence of a predetermined number of contiguous READs to a predetermined address in one of said N pages and for changing the logic state of a first output, connected to a third terminus of said address bus;
 latch means responsive to said sequence detecting means connected to said first output and to a portion of said address bus for latching a paging control bit from an address of an access subsequent to said sequence of a predetermined number of contiguous READs to a predetermined address; and
 means responsive to said paging control bit of said latch means connected to a second terminus of said select line for selecting one of said N plurality of pages of said memory device for a subsequent access to said memory device.

3. The apparatus of claim 2, further comprising a WRITE line connected at a first terminus to said processor and at a second terminus to said memory device.

4. The apparatus of claim 3, wherein said memory device includes an address space for at least thirty-two thousand words.

5. The apparatus of claim 4, wherein each said word includes at least eight bits.

6. The apparatus of claim 5, wherein said memory device address space is organized into four separately addressable pages.

7. A method of accessing a page of a paged memory comprising the steps of:
 performing a READ operation to a predetermined address location;
 repeating the previous step at least once forming a sequence of READ operations to said predetermined address location;
 detecting the sequence of READ operations to said predetermined address location and enabling a latch device according to the detected sequence;
 performing a READ operation to an address in which a page selecting word is encoded;
 latching said page selecting word in said enabled latch device according to the detected sequence; and
 decoding said page selecting word and selecting the page of the paged memory to which a subsequent access is performed.

8. The method of claim 7, further comprising the steps of discarding data bits on a data bus after each READ of said sequence of READ operations in order to clear said data bus for data bits that are associated with said subsequent access.

9. The method of claim 8, further comprising the step of disabling said latch from changing the currently selected page when any READ operation that is not to the predetermined address location is performed.

10. An apparatus, comprising:
 a processor having an address port, a data port, and a control port;
 an address bus connected at one terminus to said address port of said processor;
 a data bus connected at one terminus to said data port of said processor;
 a READ line connected at one terminus to a READ control line connection of said control port of said processor;
 a select line connected at one terminus to a select control line connection of said control port of said processor;
 a memory device having a plurality of addresses divided into a plurality of N pages connected to a second terminus of said data bus, and a second terminus of said READ line;
 means for detecting a sequence of a predetermined number of contiguous READs to a predetermined address in one of said N pages and changing a logic state of a first output, connected to a second terminus of said address bus;
 first latch means responsive to said sequence detecting means connected to said first output of said sequence detecting means and to said address bus for latching a first portion of an offset address from said address bus after the end of said sequence and a second portion of said offset address after said first portion of the offset address;
 second latch means responsive to said sequence detecting means connected to said first output of said sequence detecting means, and to a first output of said first latch means for latching said first portion of said offset address after said second portion of said offset address has been inputted to said first latch means from said address bus;

adder means, having a first addend input connected to a second terminus of said address bus and a second addend input connected to a second output of said first latch means and a first output of said second latch means, for generating a self paging address by adding the address inputted on said first addend input to an offset address inputted on said second addend input, said offset address being a concatenation of said second portion and said first portion outputted on the outputs of the first latch means and the second latch means, respectively, after the latching of said second portion in said first latch means; and offset address bus means connected between an output of said adder and an input of said memory device for accessing said self paging address location no matter which of said N plurality of pages of said memory device said self paging address is located on.

11. The apparatus of claim 10, further comprising a WRITE line connected at a first terminus to said processor and at a second terminus to said memory device.

12. The apparatus of claim 11, wherein said memory device includes an address space for at least thirty-two thousand words.

13. The apparatus of claim 12, wherein each said word includes at least eight bits.

14. The apparatus of claim 13, wherein said memory device address space is organized into four separately addressable pages.

* * * * *

UNITED STATES PATENT AND TRADEMARK OFFICE
CERTIFICATE OF CORRECTION

PATENT NO. : 5,155,826

DATED : October 13, 1992

INVENTOR(S) : Richard J. Fadem

It is certified that error appears in the above-identified patent and that said Letters Patent is hereby corrected as shown below:

Title page, --[73] Assignee: NCR Corporation, Dayton, Ohio--

Title page, --Attorney, Agent, or Firm-- Jack R. Penrod--

Signed and Sealed this

Ninth Day of November, 1993

*Attest:*

BRUCE LEHMAN

*Attesting Officer*  *Commissioner of Patents and Trademarks*